United States Patent [19]
van Latenstein

[11] 3,811,866
[45] May 21, 1974

[54] PROCESS AND APPARATUS FOR THE MANUFACTURING OF ROASTED, BAKED OR SINTERED ORE PELLETS, AS WELL AS THE ORE PELLETS THUS OBTAINED

[75] Inventor: Anthonie van Latenstein, Santpoort, Netherlands

[73] Assignee: Koninklyke Nederland sche Hoogovens En staalfabriken N.V., Ijmuiden, Netherlands

[22] Filed: Aug. 30, 1971

[21] Appl. No.: 176,037

[30] Foreign Application Priority Data
Aug. 31, 1970 Netherlands .................. 7012876

[52] U.S. Cl. .................................. 75/5, 432/14
[51] Int. Cl. ................................. F27d 3/00
[58] Field of Search ............ 263/28, 44, 52; 423/77, 423/14, 135, 241; 75/200, 5

[56] References Cited
UNITED STATES PATENTS
2,367,063  1/1945  Shallock ........................... 263/28
2,119,615  6/1938  Wendeborn ..................... 263/28

*Primary Examiner*—John J. Camby
*Assistant Examiner*—Henry C. Yuen
*Attorney, Agent, or Firm*—Hall & Houghton

[57] ABSTRACT

In manufacturing roasted, baked, or sintered ore pellets, from green pellets formed from a mixture substantially consisting of ore powder, by a process of the type which comprises forming a stream of the pellets and (a) heat treating the pellets to effect the roasting, baking or sintering thereof, (b) then cooling the pellets, (c) then screening them and (d) thereafter transporting them, the process is improved (e) by conducting the cooling in step (b) to reduce the pellets to a temperature of not over 60°C, and (f) by moistening the screened pellets following step (c) to a water content of 2 to 5 percent by weight, whereby liberation of dust from the pellets during their transportation in step (d) is inhibited. The cooling in step (b) is effected by air cooling to 100°–400°C followed by spraying the pellets with water up to about 6 percent of their weight. Further spraying before and after screening is preferred, and the apparatus aspect of the invention is also disclosed.

6 Claims, 1 Drawing Figure

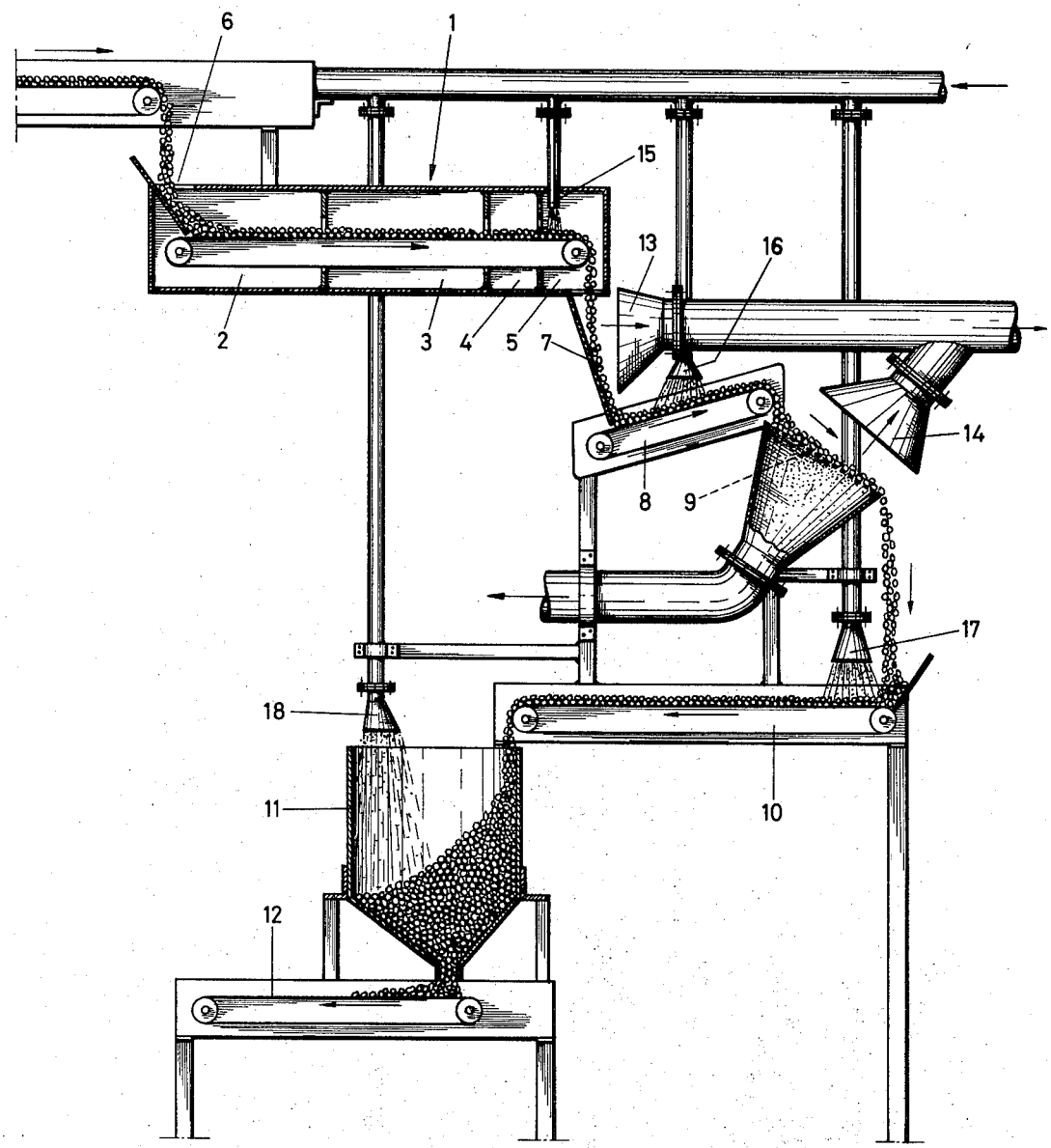

PROCESS AND APPARATUS FOR THE MANUFACTURING OF ROASTED, BAKED OR SINTERED ORE PELLETS, AS WELL AS THE ORE PELLETS THUS OBTAINED

This invention relates to a process and an apparatus for the manufactureing of roasted, baked or sintered ore pellets or similar products, whereby pellets are formed from a mass, substantially consisting of fine ore powder, which pellets are passed through a roasting, baking or sintering plant and subsequently, after having been cooled, are screened and subsequently transported. Furthermore, the invention relates to the roasted, baked or sintered pellets thus manufactured.

Pellets are commonly used nowadays as charge for blast furnaces. In this respect they have great advantages over a charge of lump ore.

Although the production of pellets presents no great problems from a technical viewpoint, said production often does have the great disadvantage of the resulting considerable dust formation. In many stages of the production process this dust formation occurs, but it is particularly objectional during the roasting, baking or sintering, screening, and subsequent transporting of the pellets.

In modern pellet production plants, in particular those which are set up in densely populated areas, the preventing and combating of the dust formation will therefore receive most careful attention. In this respect it is known to set up dust removing plants around the discharge side of the roasting, baking or sintering plant and around the screening plant, in which in a subsequent process the roasted pellets are separated by screening from chips of broken ore nuggets. Although with this practice it is achieved that an adequate dust control is obtained locally, it nevertheless appears that by said dust removing plants the dust problem in its generality has not been solved. This conclusion holds good regardless of which type of dust removing system known in the art is used at the site.

The conveyance of the screened pellets generally takes place through a system of belts, discharge stations and storage bunkers or hoppers. If the pellet manufacturing plant is set up in the proximity of a blast furnace, this transport system may be adapted to be connected to the feed system of said blast furnace.

It has now appeared that even if there are provided dust removing plants at the end of the roasting plant and in the proximity of the screening plant, dust will be formed again, or at least liberated again, at every subsequent discharge station or hopper. A considerable dust nuisance will be the result.

The obvious solution to said problem appears to be to provide a supplementary local dust removing system in the proximity of every point in the transport system where dust is liberated. The capital outlay required thereto is so substantial, however, that said solution should be rejected for reasons of economy.

It is the object of the present invention to provide an adequate protection against dust nuisance, while avoiding the aforementioned substantial capital outlay.

The present invention consists in that the pellets, after having been roasted, baked or sintered, are cooled to a temperature not exceeding 60°C, and, after having been screened, are moistened to contain a quantity of water amounting to 2 to 5 percent by weight of the pellets. Generally, the cooling of the pellets is carried out in a far less intensive manner. Inasmuch as said cooling generally occurs by sucking through ambient air, particularly the cooling to temperatures not exceeding 100° will require much additional length of the cooling sections, as well as needing high fan capacities. With the processes known in the art, the pellets are generally conveyed in dry condition with a temperature of approximately 120°C. However, by keeping them moist in transit, the dust formation does not appear to be forthcoming during the discharging thereof. To make it possible for the pellets to be moistened with water, without most of the water evaporating and the pellets thus subsequently drying up again, it has appeared to be necessary first of all to cool the pellets to a temperature not exceeding 60°C.

Although in the preamble and in the description following hereinafter reference is constantly made to a process for the manufacturing of roasted, baked or sintered pellets, the invention is not limited hereto. Taken in general, the invention relates to a process and an apparatus for the manufacturing of roasted, baked or sintered products, which manufacturing is carried out by a process which is analogous to the manufacturing process of pellets.

As previously indicated, it is conceivable to achieve the cooling at a temperature not exceeding 60° by sucking through cooling air. With this it has appeared, however, that, seen over the height of the bed of pellets, there still remain considerable differences in temperature, whereby in particular a considerably higher temperature is retained in the top layer of pellets. For this reason, according to the invention the pellets are preferably first of all air dried to a temperature ranging from 100° to 400°C, whereupon the cooling is continued by the spraying of water in a quantity amounting to approximately 6 percent by weight of pellets, whereby said pellets are subsequently cooled to a temperature ranging from 30° to 50°C. Since the pellets first of all have to be air cooled from a temperature of approximately 1,320°C to a temperature ranging from 100° to 400°C, and preferably ranging from 120° to 150°C, the zone in which the water is sprayed on the pellets will be determined by several controllable or varying factors. Generally, however, spraying will occur about halfway through the cooling period.

It is remarked that for reasons of quality and technique, it is not desired to carry out the water cooling immediately after the last pelletizing zone in the roasting, baking or sintering plant. In that zone the temperature of the pellets is still so high that due to the considerable cooling by the spraying of water, the pellets may become cracked and produce a substantial amount of dust. Furthermore, it is desired to have the cooling occur in such a zone before the end of the cooling zone, that the water applied by spraying will be evaporated before the point at which the pellets are discharged from the belt. This is so because a considerable formation of steam in the proximity of said point would cause substantial amounts of dust together with the generated water vapour to pass into the dust removing system at the site, on account of which said system could easily get blocked.

The vapour generated in the cooling zone acquires a temperature exceeding 100°C. Consequently, there is no condensation possible. The mixture of air and water vapour formed in the cooling zone is utilized for the drying of the moist pellets. The dust entrained by the cooling air and the resulting water vapour is subsequently filtered by the bed of moist pellets. In this manner it is prevented that there occurs a serious environment pollution.

As has been previously remarked, the course of the temperature gradient (graph curve) in the cooling zone is determined by several factors, such as the thickness of the bed of pellets in the roasting, baking or sintering plant, the belt speed through said plant, and the temperature of the bed of pellets at the end of the roasting, baking or sintering zone. According to the present invention a process is preferred in which the temperature of the pellets at the end of the cooling zone is adjusted by choosing the quantity of water applied by spraying in dependency on the conveyed quantity and the belt speed of the conveyor carrying the pellets through the roasting, baking or sintering plant, and on the temperature of the pellets at the beginning of the cooling zone.

In certain conditions the quantity of water required for the cooling is even further restricted by additional factors which may also effect the choice of the zone in which the water will be injected. Thus, the quantity of water vapour generated in the cooling zones of the roasting, baking or sintering, plant may become too high, so that difficulties may arise in the operating system of the roasting, baking or sintering plant. As for an economic production process the high temperature of the cooling medium is used again for the drying and pre-heating of the unroasted pellets, the water vapour generated during the spraying of water will also flow along in said regenerating process. If the quantity of generated water vapour is too high, the dew point of the hot-air vapor mixture may rise to such an extent that problems may arise in the regenerating process. Apart from this, too high a moisture content of the cooling medium may be harmful for the structure of the roasting, baking or sintering plant. In particular it is conceivable that due to hydration the refractory lining of the roasting plant will start to erode, or that mechanical parts, such as fans, and the like, will be severely attacked.

Under such circumstances it has nevertheless appeared possible according to the invention to cool the mass of pellets to a sufficient extent, without allowing an impermissible quanitity of water to pass into the system of the cooling zones of the roasting, baking or sintering plant. This may be achieved by a subsequent water cooling during the conveyance of the pellets to the screening plant.

As has been previously remarked, it is the object of the invention to have the pellets in moist condition during the subsequent conveyance from the screening plant. However, it is undesirable to moisten the pellets to such an extent that an excess of moisture will interfere with the charging of the blast furnace. Precautions should also be taken that the mechanical parts in the transport system will not be affected by dripping water loaded with muddy ore deposits.

For these reasons, an embodiment of the process according to the invention is to be recommended, in which embodiment the quantity of water used for the moistening of the pellets is adjusted in dependency on the conveyed quantity and the speed of the belt conveying the pellets and the water-absorption capacity of the pellets, so that during the next discharging of the pellets the moistened pellets will not carry any free water along with them.

It will often appear necessary to include in the discharge system a storage hopper between the pellet manufacturing plant and a blast furnace. It has appeared that under certain circumstances, loose dust may be formed again in the mass of pellets leaving said storage hoppers. This may be accounted for by the fact that if said mass is passed through large hoppers, a more than negligible quantity of chips is produced, because of which the water-absorption capacity of the mass will be increased. However, due to the relatively long residence time of the pellets in the hoppers, the previously applied water will also penetrate deeper into the core of the pellets, which will be combined with a certain dehydration of their outer skin. Any dust adhering to the pellets by moisture will thus become detached.

The aforesaid disadvantage may be met according to the invention by subjecting the pellets to a second moistening process in the storage hoppers.

In addition to the process described above, the invention relates to an apparatus for the manufacturing of roasted, baked or sintered pellets according to said process. To this end, said apparatus includes means for the production of unroasted pellets, a roasting, baking or sintering plant with several cooling zones, a belt conveyor for the conveying of the roasted pellets to a screening plant, as well as a transport system for the discharge of the screened pellets, while it is moreover characterized in that there are means present for the spraying of water onto the pellets downstream of the first cooling zone and past the screening system.

As previously elaborated, the apparatus is moreover preferably embodied in such a way that there are provided means for the spraying of water onto the belt conveyor before the screening system and in a storage hopper which is included in the transport system for the discharge of the screened pellets.

By including the cooling zone(s), in which water may be sprayed, in a regenerating circuit for the drying and pre-heating of the unroasted pellets by the heat generated in said cooling zone(s), it is furthermore possible according to the invention to improve the economy of the process considerably as well as to decrease the dust nuisance of the environment. Moreover the temperature in the drying and pre-heating sections of the roasting plant may be carefully adjusted by accurately metering the quantity of cooling water.

In this respect it may be remarked that the dust formed in the cooling zones is passed by the regenerating system into the drying zone of the roasting plant and is subsequently absorbed therein by the bed of pellets. The greater part of the dust formed is thus retained in the process. Because water is sprayed on the pellets, the cooling zone may be shorter than if only air cooling would have to be used to achieve the same temperature level. Moreover a cut in fan power may be obtained, as considerably less cooling air has to be guided through the bed of pellets.

Finally, the invention relates to roasted, baked or sintered pellets which have been manufactured according to the process described above and with the aid of the apparatus described above. Said pellets appear to cause less dust nuisance during storage and transport than other pellets known in the art.

The invention will now be described in more detail with reference to the annexed, diagrammatical process flow sheet drawing. In said diagram, the course of the roasting process is very diagrammatically illustrated with the aid of the following reference numerals.

The roasting, baking or sintering plant 1 comprises successively drying and pre-heating zone 2, a number of roasting zones 3, and two cooling zones 4 and 5.

So-called "green" pellets, which have been formed but not roasted, are fed to the drying zone at 6, and are thereupon carried through the entire roasting plant 1 on a continuous roasting belt. After having passed the last cooling zone 5, the pellets are discharged at 7 onto an ascending belt conveyor 8 which feeds them to a screen 9. The pellets coming from said screen are passed into a transport system for the discharge thereof, which system includes belts, storage hoppers and subsequent belts, which are diagrammatically indicated by reference numerals 10, 11 and 12.

Means at 13 and 14 for sucking away dust lead to dust removing plants, causing the dust whirling up to be removed from the discharge point of the roasting plant 1 and of the screening plant 9.

Water is sprayed on the transported mass at 15, 16, 17 and 18 i.e. at the beginning of the second cooling zone, on the belt 8, immediately after the screen 9, and in the storage hopper 11.

I claim:

1. An improved process for manufacture of roasted, baked or sintered pellets from green pellets formed from a mixture substantially consisting of ore powder, said process being of the type which comprises forming a stream of the pellets and
   a. heat treating the pellets to effect roasting, baking or sintering thereof,
   b. then cooling the pellets,
   c. then screening the pellets, and
   d. thereafter transporting the pellets, the said process being improved by
   e. conducting the cooling in step (b) to reduce the pellets to a temperature of not over 60°C, and
   f. moistening the screened pellets following step (c) to a water content of 2 to 5 percent by weight, whereby liberation of dust from the pellets during their transportation in step (d) is inhibited.

2. An improved process as claimed in claim 1, said process being further improved by
   g. effecting the cooling in step (e) by
      1. first air cooling the pellets to a temperature in the range of 100° to 400°C, and
      2. then spraying the pellets with water in a quantity of up to about 6 percent of the weight of the pellets,
   whereby the pellets are cooled to a temperature range from 30° to 50°C.

3. An improved process as claimed in claim 2, said process being further improved by
   h. regulating the quantity of water supplied in step (g) (2) in dependence on
      1. the quantity and speed of movement of the stream of pellets in step (a), and
      2. the temperature of the pellets at the beginning of cooling step (g).

4. An improved process as claimed in claim 3, said process being further improved by
   i. further spraying the pellets with water following step (g) before the screening thereof in step (c).

5. An improved process as claimed in claim 4, in which step (d) involves conveying the pellets to and discharging them at a point of discharge, said process being further improved by
   j. adjusting the quantity of water applied in step (i) in dependency on the quantity and speed at which the pellets are conveyed in step (i) and in dependency on the water absorption capacity of the pellets, to be sufficient to further moisten the pellets but not sufficient to enable them to carry free water along with them at said point of discharge.

6. An improved process as claimed in claim 1, in which step (d) involves transportation of the pellets to and from storage hopper means, and said process is further improved by
   g. further moistening the pellets with water in such storage hopper means.

* * * * *